Dec. 27, 1949  W. KRIEGSHEIM  2,492,530
SEALING DEVICE
Filed March 7, 1946  2 Sheets-Sheet 1

INVENTOR
WILLIAM KRIEGSHEIM
BY Gustav Drews
ATTORNEY

Dec. 27, 1949   W. KRIEGSHEIM   2,492,530
SEALING DEVICE
Filed March 7, 1946   2 Sheets-Sheet 2
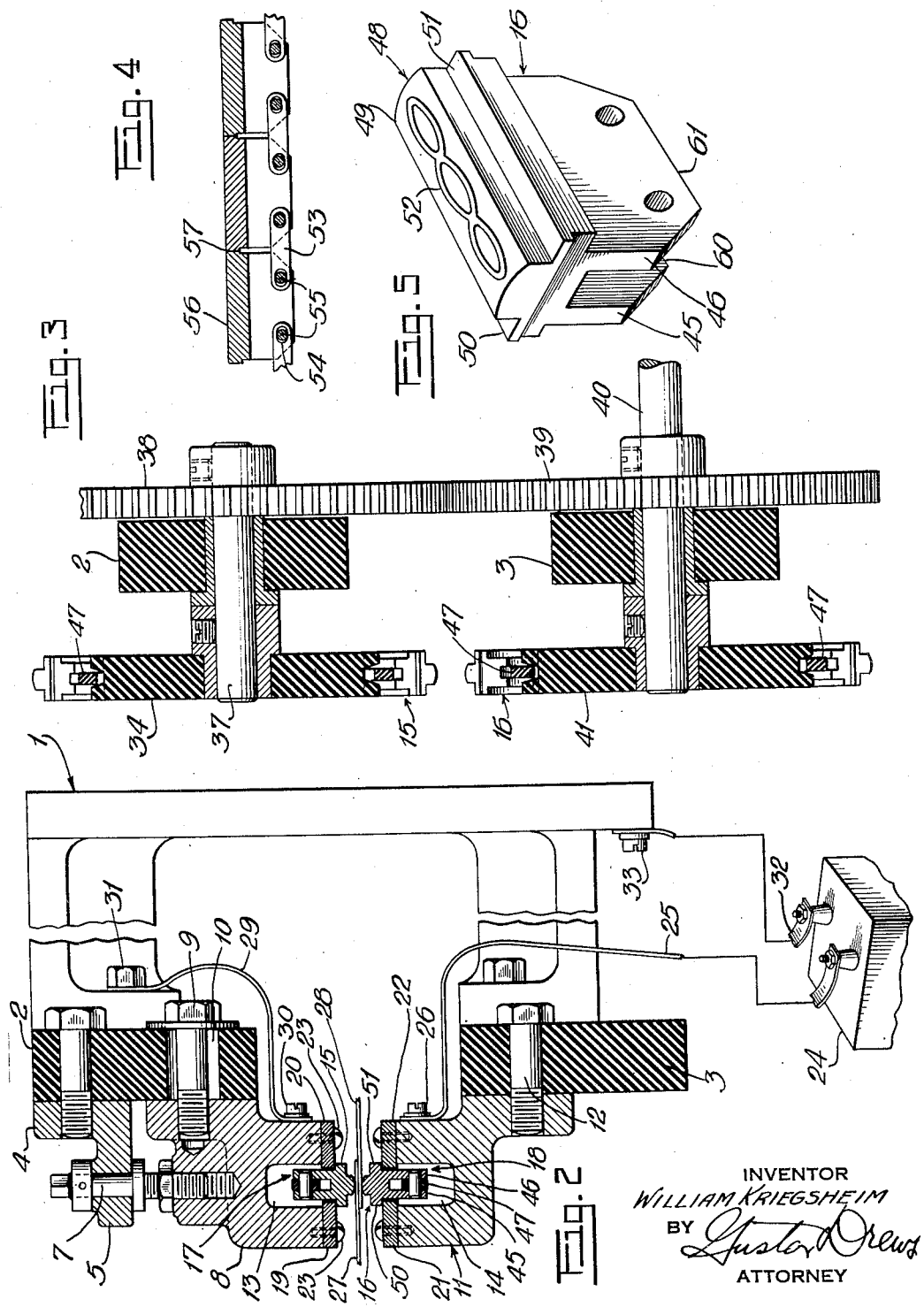
INVENTOR
WILLIAM KRIEGSHEIM
BY Gustav Drews
ATTORNEY Patented Dec. 27, 1949

2,492,530

UNITED STATES PATENT OFFICE 2,492,530

SEALING DEVICE

William Kriegsheim, Long Island City, N. Y., assignor to Permo-Seal Plastics Corporation, New York, N. Y., a corporation of New York Application March 7, 1946, Serial No. 652,774

6 Claims. (Cl. 219—47)

This invention relates to sealing devices in general and more particularly to electric sealing devices for securing to one another sheets composed of substances such as vinyl resin, plasticized polyvinyl chloride, vinylidene chloride and rubber hydrochloride, known in the trade as "Vinylite," "Koroseal," "Saran" and "Pliofilm," respectively.

Heretofore various sealing devices have been contrived, the results of which, however, had rather objectionable limitations. Where the sealing devices relied mainly upon heat, the temperatures required to cause the films to adhere to one another would frequently destroy the natural physical characteristics of the films themselves.

Attempts have been made to effect the seal by currents of high frequency and low temperature characteristics. With the mechanisms heretofore relied upon to effect this seal, either the time consumed was objectionable or else the seal was unsatisfactory.

In view of the foregoing, the present invention aims to provide an improved mechanism for expeditiously effecting a satisfactory seal.

It is still another object of the present invention to provide a mechanism substantially continuous in operation which will expeditiously effect a satisfactory seal.

More specifically, the present invention aims to provide two integrated endless members which will not only serve to grip and feed the two sheets to be sealed, but at the same time effect the seal.

It is still another object of the present invention to provide an improved sealing mechanism including two integrated endless members in which the successive units of the two endless members will register with one another, constitute electrodes insulated from the remainder of the endless members and grip the two sheets to be sealed to advance the same, and at the same time seal the same.

It is still another object of the present invention to provide a sealing device including two integrated endless members which will grip the sheets to be sealed to advance the same, and at the same time seal the same, the units of which integrated members may have formed thereon engraved designs, which designs will be imparted to the sheets at the sealing seam or joint.

It is still another object of the present invention to provide an improved sealing machine for sealing sheets composed of substances such as vinyl resin, plasticized polyvinyl chloride, vinylidene chloride and rubber hydrochloride, known in the trade as "Vinylite," "Koroseal," "Saran" and "Pliofilm," respectively, which includes two endless integrated members, the successive units of which when registering with one another will grip the sheets being sealed to advance the same, will have current pass through the same characterized by a frequency of 60 megacycles of low power, between 50 and 200 watts, and producing a temperature substantially between 150° and 200° C., whereby not only the surface of the sheets will soften in the act of sealing, but the entire inner structure, resulting in the molecular interchange at the point of contact between the contacting sheets to form a substantially homogeneous structure at the joint or seam.

These and other features, capabilities and advantages of the invention will appear from the subjoined detail description of one specific embodiment thereof illustrated in the accompanying drawings, in which Fig. 1 is a fragmental end elevation partly in section of the machine made according to the present invention.

Fig. 2 is a section on the line 2—2 of Fig. 1.

Fig. 3 is a section on the line 3—3 of Fig. 1.

Fig. 4 is a fragmental section of a part of another embodiment of the endless member.

Fig. 5 is an enlarged perspective of one of the units of the endless member.

Figure 1:
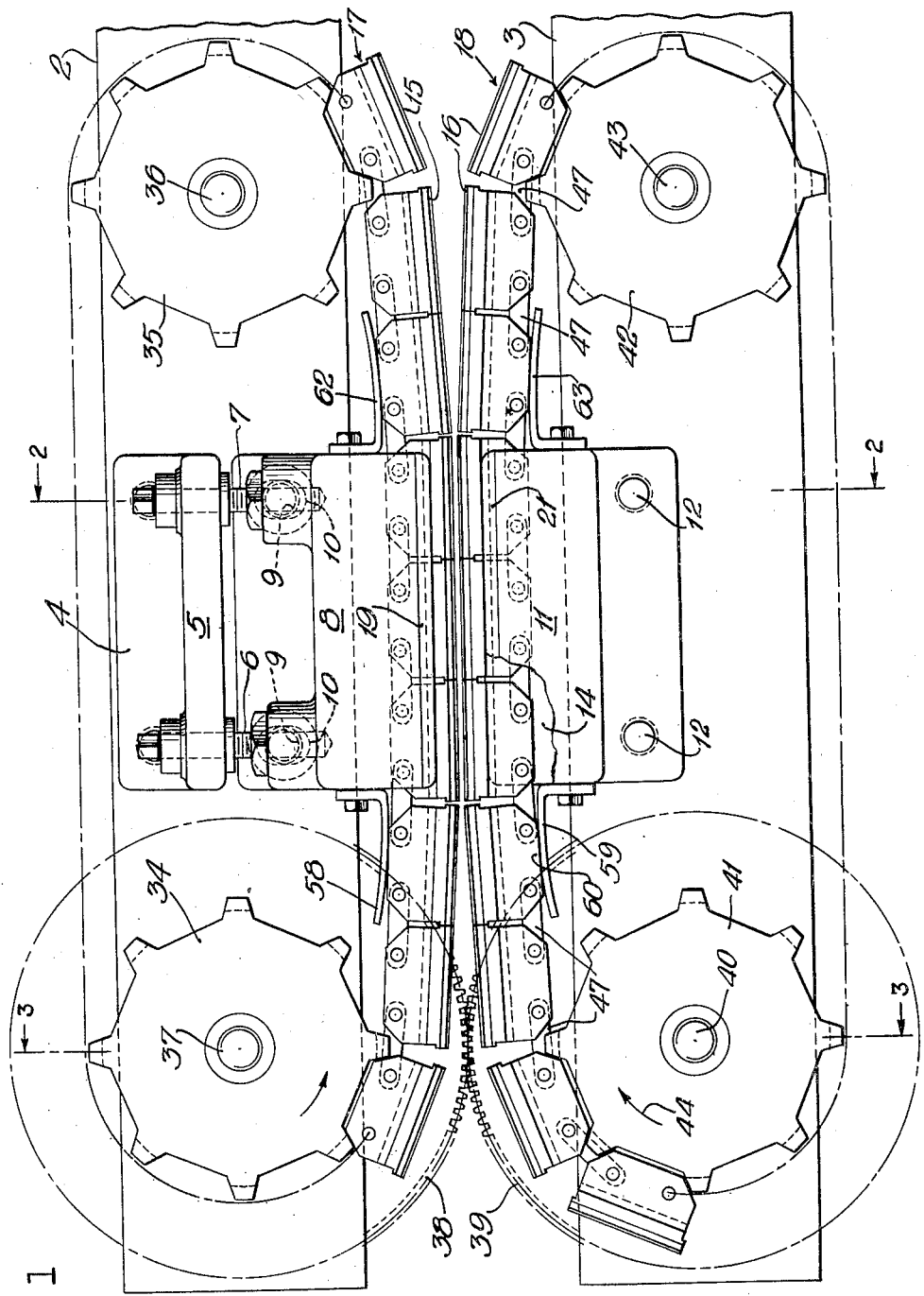

In Fig. 2 there is shown a main frame 1 to which are secured two insulated blocks 2 and 3. The insulated blocks 2 and 3, see Fig. 1, may extend the full length of the machine. To the insulated block 2 there is secured the L-shaped metal bar 4 through the web 5 of which extend the set screws 6 and 7. Beneath the bar 4 there is formed the upper jaw member 8 which is secured to the insulated block 2 by the screws 9. The screws 9 are screw threadedly connected to the jaw member 8 but freely movable in the opening 10 through the block 2. This clearance between the block 2 and the screw 9 is provided so that the set screws 6 and 7 which are screw threadedly connected to the jaw member 8 may position the jaw member 8 a greater or lesser distance from the bar 4 according to the width or mouth to be formed between the jaw member 8 and the jaw member 11. The jaw member 11 is fixed to the insulated block 3 by the screws 12. The jaw member 8 has an elongated slot 13 registering with the elongated slot 14 in the jaw member 11 to receive the units 15 and 16 of the two endless integrated members 17 and 18, respectively. While the jaw members 8 and 11 are composed of a suitable electric conductor such as metal, their opposing ends are preferably provided with adjustable plates, such as the plates 19 and 20, secured to the ends of the jaw 8 to either side of the recess 13 and the plates 21 and 22 secured to the ends of the jaw 11 to either side of the recess 14. The plates 19, 20, 21 and 22 are secured in place by the screws 23, the screws 23 being screw threadedly connected to the jaws 8 and 11.

The units 15, as shown in Fig. 2, successively pass through the recess 13 and the units 16 successively pass through the recess 14. While they are moving through these recesses 13 and 14, the current emanating from a low power generator 24 will pass through the flat copper strip 25 to the jaw 11, being connected thereto by the screw 26 and from the jaw 11 pass through the conducting bars 21 and 22 to the units 16 and from the units 16 through the two sheets 27 and 28 overlapping one another as shown in Fig. 2, to the units 15, and the units 15 to the bars 19 and 20, and from the bars 19 and 20 to the jaw 8, and from the jaw 8 grounded to the frame 1 by the flat copper strip 29 connected to the jaw 8 by the screw 30 and to the frame 1 by the bolt 31. The generator 24, see Fig. 2, in the present instance is grounded to the frame 1 by the flat copper strip 32 connected to the generator 24 at one end and by the screw 33 to the frame 1.

Preferably the units 15 are connected to one another to form the endless integrated member 17 which is mounted on the insulated sprocket wheels 34 and 35, the sprocket wheel 35 being mounted on the shaft 36 journalled in the block 2 and the sprocket wheel 34 being fixed to the shaft 37 extending through the block 2, see Fig. 3, and having secured thereto the gear 38 which meshes with the gear 39 fixed on the driven shaft 40 extending through the block 3 and having fixed on its other end the sprocket wheel 41 which cooperates with the sprocket wheel 42 mounted on the shaft 43 journalled in the block 3, the sprocket wheels 41 and 42 both being composed of insulating material in the present instance and cooperating with the units 16 of the endless integrated member 18. In view of the foregoing, when the shaft 40 is driven in the direction of the arrow 44, it will cause through the gears 39 and 38 the integrate members 17 and 18 simultaneously to move through the recesses 13 and 14 of the jaws 8 and 11, respectively.

The units 15 and 16 are substantially identical to one another and for this reason it is believed sufficient to describe in detail the unit 16 illustrated in Fig. 5. It preferably has two cheeks 45 and 46 spaced from one another to receive the ends of links 47. The cheeks 45 and 46 are connected by the head 48 having a diminished portion 49 and shoulders 50 and 51. The shoulders 50 and 51, see Fig. 2, ride on the outer faces of the bars 21 and 22, respectively, and the outer face of the diminished portion 49, preferably arcuate and convex in shape, engages the outer face of the adjacent sheet 28.

In some instances the convex outer face of the diminished portion 49 has engraved thereon any suitable design. In the present instance, the three ringed connected depression 52 is merely indicative of a design.

Preferably the links 47 are composed of insulated material so that the current when passing through the jaw 11 to the jaw 8 through the units 16 and 15 positioned in the jaws 11 and 8, will not be wasted and pass through any of the units 16 and 15 other than those in direct contact with the jaws 11 and 8. In this way, for a given efficiency, the current consumption may be maintained at a minimum. Furthermore, when so intermittently directing the current through the units 15 and 16, a predetermined temperature in the units 15 and 16 may be maintained with facility. Practice has shown that when the current passes through all of the units 15 and 16 during a sealing operation, especially when the machine is operated at high speed, that the temperature of the units 15 and 16 will gradually increase so that a different seal will be produced at the end of an operation as compared with a seal produced at the beginning. In other words, when the links 47 are insulated and the current is only intermittently directed through the units 15 and 16, the intermittent cooling of the units 15 and 16 will contribute materially to producing a comparatively uniform seal for a long period of time.

When the units 15 and 16 are pushed through the jaws 8 and 11 by connecting the sprocket wheel 41 to the drive, then the tendency will be to force the units 15 and 16 into engagement with one another while passing through the jaws 8 and 11 so that the joint or seam produced by the seal will be a continuous uninterrupted seal.

When the links, such as the links 53 of the embodiment illustrated in Fig. 4, have enlarged openings 54 to clear the pins 55 of the units 56, then especially when the units 56 are pushed through the jaws 11 and 8 they will intimately engage one another at the point 57 to insure a continuous uninterrupted seal.

Excellent results have been achieved with this machine when the sheets are composed of vinyl resin, plasticized polyvinyl chloride, vinylidene chloride and rubber hydrochloride, known in the trade as "Vinylite," "Koroseal," "Saran" or "Pliofilm," respectively, and the current produced by the generator is characterized by 50 and 200 watts, and a frequency of 60 megacycles or less when the temperature in the sheets being sealed does not exceed 200° C., but generally exceeds 150° C.

In order to guide the units 15 and 16 into the jaws 8 and 11, so that the outer faces of the diminished portions 49 will be properly alined with one another during the sealing operation, the curved guide wings 58 and 59 are secured to the front ends of the jaws 8 and 11, respectively, the convex face of which wings 58 and 59 will, as shown in Fig. 1, engage the edges 60 and 61 of the wings 45 and 46, respectively. Preferably similar wings, such as the wings 62 and 63 are secured to the rear ends of the jaws 8 and 11, respectively, so that the units 15 and 16 will not, when leaving the jaws 8 and 11, cause any preceding units to be displaced or to exercise any undue strain on any preceding units that may still be in the jaws 8 and 11.

The sealing devices made according to the present invention are particularly adapted for sealing long sheets of "Vinylite" and the like to one another in the process of forming shower curtains and the like. For this purpose, excellent results have been achieved when the width of the portions 49 does not exceed three-sixteenths of an inch so that the width of the resulting seal between the two sheets approximates a width of from one-eighth to three-sixteenths of an inch. Excellent results have also been achieved when the width of the jaws 8 and 11 does not exceed three inches, and when the material being sealed approximates 0.006 inch in thickness.

It is, of course, obvious that the dimensions here specified with regard to the width of seal, length of jaws, and thickness of material, should only serve as an example, and that these dimensions can be materially varied without departing from the general spirit of the invention.

Preferably as shown in Fig. 1, the jaws 8 and 11 are offset relative to a straight line path of movement from one sprocket wheel to the other. When the jaws are so offset, and the links 47 connecting the units 17, 18 to one another are composed of insulated material, then, see the space between the successive units before they enter the jaws 8, 11 and immediately after they leave the jaws 8, 11, the spaces will serve to interfere with the current passing to all of the units 17, 18 and limit the passage of the current through the units 17, 18 which are positioned in the jaws 8, 11.

Since the plastic compositions vinyl resin, plasticized polyvinyl chloride, vinylidene chloride and rubber hydrochloride, known in the trade as "Vinylite," "Koroseal," "Saran" and "Pliofilm," respectively, are generally classified as synthetic resins, it is to be understood in the claims that plastic compositions of these types are referred to when using the words "synthetic resins."

It is obvious that various changes and modifications may be made to the details of construction without departing from the general spirit of the invention as set forth in the appended claims.

I claim:

1. The combination of two stationary jaws having recesses therein and spaced from one another to form a gap between the two jaws, two endless members composed of a plurality of electrically conductive units positioned to pass through the recesses of said jaws, links composed of insulated material connecting the units of each endless member to one another, means for drivingly connecting said endless members to move in the same direction while passing through said jaws, the endless members being spaced from one another just sufficient to feed with them a pair of sheets composed of a synthetic resin, a high frequency generator for generating a current of sixty megacycles or less, and electrical conductors electrically connected to said jaws to enable the current of said generator to pass from one jaw to the other and seal the sheets moving between the two, the jaws having parallel shoulders, the units having shoulders slidably engaging the shoulders of the jaws while moving through the same.

2. The combination of two stationary jaws having recesses therein and spaced from one another to form a gap between the two jaws, two endless members composed of a plurality of electrically conductive units positioned to pass through the recesses of said jaws, links composed of insulated material connecting the units of each endless member to one another, means for drivingly connecting said endless members to move in the same direction while passing through said jaws, the endless members being spaced from one another just sufficient to feed with them a pair of sheets composed of a synthetic resin, a high frequency generator for generating a current of sixty megacycles or less, and electrical conductors electrically connected to said jaws to enable the current of said generator to pass from one jaw to the other and seal the sheets moving between the two, the units being in slidable engagement with said jaws while passing through the same and having diminished portions in alinement with one another while passing through the jaws, the diminished portions of the two endless members registering with one another to engage the opposite faces of the two sheets being sealed.

3. The combination of two stationary jaws having recesses therein and spaced from one another to form a gap between the two jaws, two endless members composed of a plurality of electrically conductive units positioned to pass through the recesses of said jaws, links composed of insulated material connecting the units of each endless member to one another, means for drivingly connecting said endless members to move in the same direction while passing through said jaws, the endless members being spaced from one another just sufficient to feed with them a pair of sheets composed of a synthetic resin, a high frequency generator for generating a current of sixty megacycles or less, and electrical conductors electrically connected to said jaws to enable the current of said generator to pass from one jaw to the other and seal the sheets moving between the two, the units being in slidable engagement with said jaws while passing through the same and having diminished portions in alinement with one another while passing through the jaws, the diminished portions of the two endless members registering with one another to engage the opposite faces of the two sheets being sealed, the diminished portions having ornamental designs engraved thereon to enable transferring such designs to the sheets while being sealed.

4. The combination of two stationary jaws having recesses therein and spaced from one another to form a gap between the two jaws, two endless members composed of a plurality of electrically conductive units positioned to pass through the recesses of said jaws, links composed of insulated material connecting the units of each endless member to one another, means for drivingly connecting said endless members to move in the same direction while passing through said jaws, the endless members being spaced from one another just sufficient to feed with them a pair of sheets composed of a synthetic resin, a high frequency generator for generating a current of sixty megacycles or less, and electrical conductors electrically connected to said jaws to enable the current of said generator to pass from one jaw to the other and seal the sheets moving between the two, the jaws having parallel shoulders, the units having shoulders slidably engaging the shoulders of the jaws while moving through the same, the shoulders of the jaws being offset relative to the peripheries of said means to insure effecting a separation between the successive units before they enter the jaws and immediately after they leave the jaws.

5. The combination of two stationary jaws having recesses therein and spaced from one another to form a gap between the two jaws, two endless members composed of a plurality of electrically conductive units positioned to pass through the recesses of said jaws, links composed of insulated material connecting the units of each endless member to one another, means for drivingly connecting said endless members to move in the same direction while passing through said jaws, the endless members being spaced from one another just sufficient to feed with them a pair of sheets composed of a synthetic resin, a high frequency generator for generating a current of sixty megacycles or less, electrical conductors electrically connected to said jaws to enable the current of said generator to pass from one jaw to the other and seal the sheets moving between the two, the jaws having parallel shoulders, the units having shoulders slidably engaging the shoulders of the jaws while moving through the same, the shoulders of the jaws being offset relative to the peripheries of said means to insure effecting a separation between the successive units before they enter the jaws and immediately after they leave the jaws, and guides at the entrance ends of the jaws and at the exit ends of the jaws to guide the endless members to and from the jaws.

6. The combination of two stationary jaws having recesses therein and spaced from one another to form a gap between the two jaws, two endless members composed of a plurality of electrically conductive units positioned to pass through the recesses of said jaws, links composed of insulated material connecting the links of each endless member to one another, the links being slot and pin connected to said units to permit movement of successive units relative to one another, means for drivingly connecting said endless members to move in the same direction while passing through said jaws, means for pushing said endless members to move through said jaws in order to take up the slack between successive units and cause them intimately to engage one another while passing through the jaws, the endless members being spaced from one another just sufficient to feed a pair of sheets composed of a plastic material selected from the group including vinyl resin, plasticized polyvinyl chloride, vinylidene chloride and rubber hydrochloride, a high frequency generator for generating a current of sixty megacycles or less, and electrical conductors electrically connected to said jaws to enable the current of said generator to pass from one jaw to the other and seal the sheets moving between the two.

WILLIAM KRIEGSHEIM.

REFERENCES CITED

The following references are of record in the file of this patent:

UNITED STATES PATENTS

| Number | Name | Date |
| --- | --- | --- |
| 2,231,457 | Stephen | Feb. 11, 1941 |
| 2,346,776 | Malhiot | Apr. 18, 1944 |
| 2,439,918 | Auxier | Apr. 20, 1948 |